United States Patent
Aaron et al.

(10) Patent No.: US 11,215,955 B2
(45) Date of Patent: Jan. 4, 2022

(54) AUTOMATIC CONTROL LOOP GRADING AND DATA LABELING

(71) Applicant: AT&T Intellectual Property I, L.P., Atlanta, GA (US)

(72) Inventors: Jeffrey Aaron, Atlanta, GA (US); James Fan, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 99 days.

(21) Appl. No.: 16/696,248

(22) Filed: Nov. 26, 2019

(65) Prior Publication Data

US 2021/0157286 A1 May 27, 2021

(51) Int. Cl.
| | |
|---|---|
| *G05B 13/02* | (2006.01) |
| *G06F 17/15* | (2006.01) |
| *G06K 9/62* | (2006.01) |
| *G05B 24/02* | (2006.01) |

(52) U.S. Cl.
CPC ......... *G05B 13/0265* (2013.01); *G05B 24/02* (2013.01); *G06F 17/15* (2013.01); *G06K 9/6259* (2013.01)

(58) Field of Classification Search
CPC ..... G05B 13/0265; G05B 24/02; G06F 17/15; G06K 9/6259
USPC .......................................................... 700/47
See application file for complete search history.

(56) References Cited

U.S. PATENT DOCUMENTS

| | | | | |
|---|---|---|---|---|
| 2005/0108649 | A1* | 5/2005 | Ueda | G06F 9/547 |
| | | | | 715/760 |
| 2011/0314273 | A1* | 12/2011 | Chu | H04L 63/105 |
| | | | | 713/153 |
| 2012/0069406 | A1* | 3/2012 | Furuichi | G06Q 10/10 |
| | | | | 358/448 |
| 2017/0262164 | A1* | 9/2017 | Jain | G06F 8/38 |
| 2019/0138938 | A1* | 5/2019 | Vasseur | H04L 41/147 |

* cited by examiner

*Primary Examiner* — Jigneshkumar C Patel
(74) *Attorney, Agent, or Firm* — Hartman & Citrin LLC (57) ABSTRACT

Concepts and technologies disclosed herein are directed to automated control loop grading and data labeling ("ACLGDL"). An ACLGDL system analyzes results of an execution, by a control loop system, of a control loop. The ACLGDL system can grade the results. The ACLGDL system also can instruct, based at least in part upon the grade of the results of the execution, the control loop system to collect additional data. The ACLGDL system can label the additional data for use by an output system. The ACLGDL system can establish plurality of policies including a grading-analysis policy, a grading-results policy, a labeling-collection policy, a labeling policy, a publishing policy, and a notification policy. The ACLGDL system can publish the data labeled in accordance with the labeling policy based, at least in part, upon the publishing policy. The ACLGDL system can notify the output system based, at least in part, upon the notification policy.

20 Claims, 6 Drawing Sheets

AUTOMATIC CONTROL LOOP GRADING AND DATA LABELING

BACKGROUND

A control loop (also known as an automation loop or automation instance) is designed and deployed to mechanize manual processes to execute actions with minimal (or no) human intervention. The impact caused by the execution of a control loop can be detected through the analysis of data and environmental changes by a separate collection and analysis application. This analysis is currently performed with considerable additional effort and planning, and is likely to be insufficient in collecting and labeling data needed for machine learning, which is desired to reduce the need for manual software development (both initially and in terms of on-going improvements, optimizations, and extensions).

Traditional automation approaches do not learn, and cannot evaluate themselves to help their human users/owners improve their operation. Currently, humans must manually set up means to conduct performance measurements on an adhoc basis, which is expensive, difficult, and largely ineffective due to limited scope/duration. Further, current approaches often lack flexibility, or are unable to be exercised flexibly due to the added expense of repeated "customization."

SUMMARY

Concepts and technologies disclosed herein are directed to aspects of automatic control loop grading and data labeling ("ACLGDL"). According to one aspect of the concepts and technologies disclosed herein, an ACLGDL system can analyze results of an execution, by a control loop system, of a control loop. The ACLGDL system can grade the results of the execution, by the control loop system, of the control loop. The ACLGDL system can instruct, based at least in part upon the grade of the results of the execution, the control loop system to collect data. The ACLGDL system can label the data for use by an output system. The ACLGDL system can establish at least one policy. The operations performed by the ACLGDL system can be based, at least in part, upon the at least one policy.

The policy can include a grading-analysis policy. The ACLGDL system can analyze the results of the execution of the control loop based, at least in part, upon the grading-analysis policy. This policy can be used to evaluate how the control loop implemented by the control loop system has performed.

The policy can include a grading-results policy. The ACLGDL system can grade the results of the execution of the control loop based, at least in part, upon the grading-results policy. This policy can be used to assign a grade to the performance of a control loop implemented by the control loop system.

The policy can include a labeling-collection policy. The ACLGDL system can instruct the control loop system to collect the data based, at least in part, upon the labeling-collection policy. This policy can be used to define, based upon the grade given to the performance of the control loop implemented by the control loop system, what additional data needs to be collected.

The policy can include a labeling-assembly policy. The ACLGDL system can implement this policy to aggregate related data together as part of a preparation step for an actual labeling process.

The policy can include a labeling policy. The ACLGDL system can label the data for use by an output system based, at least in part, upon the labeling policy. This policy can be used to label data for use by the output system. In some embodiments, the output system can be or can include a machine learning system. In some embodiments, the output system can be or can include a system operated by a user.

The policy can include a publishing policy. The ACLGDL system can publish the data labeled in accordance with the labeling policy based, at least in part, upon the publishing policy. This policy can be used to determine how all gathered data is to be published for use by the output system.

The policy can include a notification policy. The ACLGDL system can notify the output system based, at least in part, upon the notification policy. This policy can be used to proactively notify a human operator (e.g., of the output system), an external process (e.g., a machine learning process of the output system embodied as a machine learning system), or some other system that a result is available for review.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

A control loop is designed and deployed to mechanize manual processes to execute actions with minimal (or no) human intervention. The impact caused by the execution of a control loop can be detected through the analysis of data and environmental changes by a separate collection and analysis application. This analysis is currently performed with considerable additional effort and planning, and is likely to be insufficient in collecting and labeling data needed for machine learning, which is desired to reduce the need for manual software development (both initially and in terms of on-going improvements, optimizations, and extensions).

The concepts and technologies disclosed herein are directed, at least in part, to automatically achieving a critical portion of the needed data collection and labeling via grading control loop outcomes, collecting data at that time including "around" the target (e.g., via templates and policies to determine what "around" exactly means), correlating with how well the control loop is doing, and recording/labeling the data accordingly.

Traditional automation approaches do not learn, and cannot evaluate themselves to help their human users/owners improve their operation. Currently, humans must manually set up means to conduct performance measurements on an adhoc basis, which is expensive, difficult, and largely ineffective due to limited scope/duration. Further, current approaches often lack flexibility, or are unable to be exercised flexibly due to the added expense of repeated "customization."

The concepts and technologies disclosed herein provide an automatic way for control loops (which take actions based on collected data that is analyzed to discover "signatures" relevant to decision-making) to measure their own performance and record their performance over time, along with all relevant data, where this process can easily be configured/re-configured in useful ways (e.g., with any desired level of specificity from very loosely to very strictly), as often as needed, repeatedly if desired, such that humans can eventually take that comprehensively recorded performance/conditions data and learn from it how best to make improvements.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
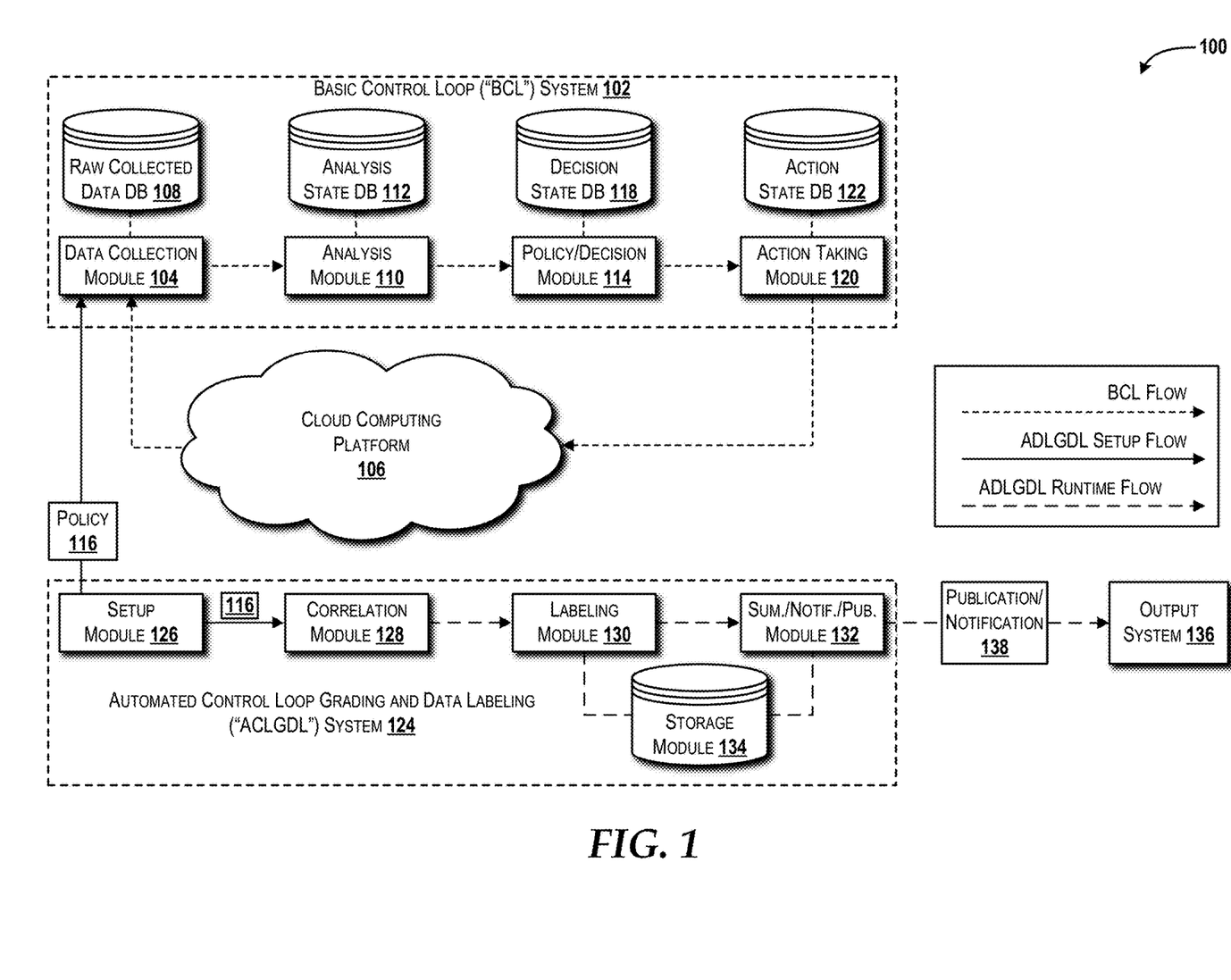
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The illustrated operating environment 100 includes a basic control loop ("BCL") system 102. The BCL system 102 can implement one or more control loops (also known as one or more automation instances) to mechanize one or more manual processes to execute one or more actions with minimal (or no) human interaction. The control loop(s) implemented by the BCL system 102 can be used to mechanize any manual process, and as such, the examples disclosed herein are merely exemplary and should not be construed as being limiting in any way.

The BCL system 102 can be implemented, at least in part, via a plurality of modules. The plurality of modules can be or can include hardware modules, software modules, or a combination of hardware and software modules. The modules may be implemented, at least in part, by virtualized components. The BCL system 102 can include one or more processors, one or more memory components, one or more network components, one or more input/output components, other components, combination thereof, and/or the like. The BCL system 102 may be implemented as a system-on-a-chip or similarly packaged system. The BCL system 102 is shown with a select few modules and corresponding databases to implement one or more basic control loops. While these modules are shown as part of a single system, these modules may alternatively be distributed across multiple systems.

The illustrated BCL system 102 includes a data collection module 104 that can collect data from one or more data sources, which, in the illustrated example, can include a cloud computing platform 106 or any component thereof. Data collected by the data collection module 104 can be stored, at least temporarily, in a raw collected data database 108. The data stored in the raw collected data database 108 can be analyzed by an analysis module 110 that maintains the state of data analyses in an analysis state database 112. A policy/decision module 114 can apply one or more policies 116 to analyzed data and maintain, in a decision state database 118, the decisions made by the BCL system 102 as a result of applying one or more of the policies 116 to the analyzed data. Based upon these decisions, an action taking module 120 can take one or more actions that can be recorded in an action state database 122. Output of the action taking module 120 can be sent back to the cloud computing platform 106, which can implement the action(s) recommended by the action taking module 120.

In accordance with the concepts and technologies disclosed herein, an automated control loop grading and data labeling ("ACLGDL") system 124 can be used to grade any control loop(s) implemented by the BCL system 102 and to label any data associated therewith. The illustrated ACLGDL system 124 includes a plurality of modules that can be implemented in hardware, software, or combination of hardware and software. The modules may be implemented, at least in part, by virtualized components. The ACLGDL system 124 can include one or more processors, one or more memory components, one or more network components, one or more input/output components, other components, combination thereof, and/or the like. The ACLGDL system 124 may be implemented as a system-on-a-chip or similarly packaged system. The ACLGDL system 124 is shown with a select few modules to grade and label any basic control loop implemented by the BCL system 102. While these modules are shown as part of a single system, these modules may alternatively be distributed across multiple systems. The illustrated ACLGDL system 124 includes a setup module 126, a correlation module 128, a labeling module 130, a summary/notification/publication module 132, and a storage module 134. Each of these modules will now be described in detail.

The setup module 126 can be executed by the ACLGDL system 124 to define what additional data/domains to look at and to correlate with control loop performance. For example, the setup module 126 can define additional data associated with one or more domains, such as the cloud computing platform 106 or some specific portion thereof. The setup module 126 can be configured to define the policy(ies) 116. The policies 116 can be defined for different aspects of the ACLGDL system 124. Some example policies will now be described.

A "grading-analysis policy," as used herein, refers to a policy used to evaluate how a basic control loop implemented by the BCL system 102 has performed. A "grading-results policy," as used herein, refers to a policy used to assign a grade to the performance of a basic control loop implemented by the BCL system 102. A "labeling-collection policy," as used herein, refers to a policy used to define, based upon the grade given to the performance of a basic control loop implemented by the BCL system 102, what additional data needs to be collected (e.g., from the cloud computing platform 106, some portion thereof, and/or another domain (not shown)). A "labeling-assembly policy," as used herein, refers to a policy used to aggregate related data together as part of a preparation step for the actual labeling process. A "labeling policy," as used herein, refers to a policy used to label data for use by a human user, a machine learning system, and/or another system not specifically mentioned herein. A "publishing policy," as used herein, refers to a policy used to determine how all gathered data is to be published for use by a human user, a machine learning system, and/or another system not specifically mentioned herein. A "notification policy," as used herein, refers to a policy used to proactively notify a human operator, an external process (e.g., a machine learning process), or some other system that a result is available for review (i.e., has been published).

The correlation module 128 can be executed by the ACLGDL system 124 to correlate basic control loop performance with a grade (e.g., "1-5," or "A, B, C, D, F"). The grade can be established using any grading scheme, such as a scale from 1 to 5, with 1 being the worst to 5 being the best, or an alphabetic grading scheme like those used in many academic settings. Words or phrases alternatively may be used to grade basic control loop performance as "good," "better," or "best." The grading scheme can be customized for a particular basic control loop, group of basic control loops, or for any other reason (e.g., user/operator preferences). All of these grading schemes are merely exemplary of some examples that may be used to designate a particular grade. As such, the examples provided herein should not be construed as being limiting in any way.

The labeling module 130 can be executed by the ACLGDL system 124 to automatically label recorded data for subsequent consumption by an output system 136. The output system 136 may be a machine learning system (best shown in FIG. 6). The output system 136 may be a user's system, where the user is a data analyst/scientist, for example. Multiple output systems 136 also are contemplated. The labeling module 130 can store the labeled data in the storage module 134 until the publication module 132 is ready to send at least a portion of the labeled data to the output system 136.

The publication module 132 can be executed by the ACLGDL system 124 to summarize results (e.g., grade and/or labeled data) of the ACLGDL system 124, notify the output system 136 that the results are available, and to publish the results to the output system 136. The notification and publication functions are generally shown as 138 in the illustrated example.

An exemplary use case to depict how the policies 116 can be applied and used will now be described. In this use case, a basic control loop implemented by the BCL system 102 can receive, via the data collection module 104, an overload condition fault from the cloud computing platform 106. The overload condition fault can indicate that a computing instance operating in the cloud computing platform 106 has reached or exceeded a threshold indicative of an overload condition. For example, the CPU utilization may be above the threshold value of 95%. CPU utilization is provided as an example in this use case. Those skilled in the art will appreciate that other overload conditions, other faults, and/or other reports that can be consumed by the data collection module 104 based upon operations performed by the cloud computing platform 106 may be considered as part of a basic control loop implemented by the BCL system 102. The BCL system 102 can execute the analysis module 110 to analyze the data collected by the data collection module 104 (e.g., the CPU utilization and overload condition fault) and determine that a new, more powerful computing instance (e.g., doubling the power of the virtual CPUs) is to be instantiated in response to the overload condition. The BCL system 102 can recommend, via the action taking module 120, that the previous overloaded instance be turned off and that the new instance be turned on so that the new instance can take over processing from the old, overloaded instance. The action taking module 120 can take one or more actions based, at least in part, upon one or more policies managed by the policy/decision module 114 and any corresponding decision state stored in the decision state database 118.

The setup module 126 can define one or more grading-analysis policies. The grading-analysis policies can be executed, by the correlation module 128, to analyze how effective was the action taken by the basic control loop. For example, a grading-analysis policy can define one or more data attributes to be analyzed to determine the effectiveness of the action taken. For example, if a grading-analysis policy states that after 2 hours the situation is not resolved or the problem has reoccurred, the action taken can be labeled "non-effective." In the example use case, a data attribute might be gathering CPU usage data over a time period (e.g., 30 minutes) along with virtual storage usages. The analyzed result can then be subjected to one or more grading-results policies.

The setup module 126 can define one or more grading-results policies. The grading-results policies can be executed, by the correlation module 128, to assign a grade based on the analyzed result derived from enforcement of the grading-analysis policy. As explained above, the grade can be established using any grading scheme, such as a scale from 1 to 5, with 5 being the worst to 1 being the best (or vice versa), or an alphabetic grading scheme like those used in many academic settings. Words or phrases alternatively may be used to grade basic control loop performance as "good," "better," or "best." The grading scheme can be customized for a particular basic control loop, group of basic control loops, or for any other reason (e.g., user/operator preferences). For example, a grading-results policy may state: if the problem is fixed and does not reoccur for 48 hours, a grade of "1" can be assigned; if the problem is fixed and does not reoccur within 24 hours, a grade of "2" can be assigned; if the problem is fixed and does not reoccur within 8 hours, a grade of "3" can be assigned; if the problem is fixed and does not reoccur after 2 hours, a grade of "4" can be assigned; and if the problem is not fixed or the problem does reoccur within 2 hours, a grade of "5" can be assigned. All of these grading schemes are merely exemplary of some examples that may be used to designate a particular grade. As such, the examples provided herein should not be construed as being limiting in any way.

Grading can potentially use a variety of metrics and associated analysis, such as the length of the time period before another problem occurs after the control loop takes an action (e.g., to fix a problem). Further analysis can be used to determine the amount of man-hours saved because of the control loop action, whether additional problems seem to have occurred inadvertently due to a control loop action (e.g., an unexpected or even a known possible "side-effect"), and the severity of additional problem(s). Any metrics that can be related to "effectiveness" or "goodness" of the control loop action/fix can be included. In early/initial implementations, an "effective" or "non-effective" grading analysis may be used with future implementations that provide grades with a finer granularity.

The setup module 126 can define one or more labeling-collection policies. The setup module 126 can provide labeling-collection policies to the data collection module 104 of the BCL system 102. The data collection module 104 can execute the labeling-collection policies to collect, from the cloud computing platform 106, additional data that can be used to support the grade assigned by the correlation module 128. In the example use case, a labeling-collection policy can be used to enforce collection of additional data, such as, for example: CPU usage percentages for all key processes; CPU usage spikes for each key process during a specific time period (e.g., 30 minutes); neighboring instance performance data (e.g., to determine how other instance(s) may impact the new instance, or vice versa); and/or performance data collected from the old instance.

The setup module 126 also can define one or more labeling-assembly policies. After the labeling-collection policies are executed, one or more labeling-assembly policies can be executed, by the labeling module 130, to refine the dataset of the additional data collected in accordance with the labeling-collection policy. In this step, all evidence of how the basic control loop was performing will be clearly established but not yet labeled. In the example use case, the labeling-assembly policy may be used to correlate virtual CPU performance of the new instance with one or more other instances (e.g., a nearest X number of instances). In addition, all storage performance during the same time period can be correlated with the storage performance data of the other instance(s) (e.g., the nearest X number of instances nearby instances also selected for virtual CPU performance correlation).

The setup module 126 also can define one or more labeling policies. The labeling policies can be executed, by the labeling module 130, to define exactly how and what label will be assigned to each and every piece of data. In some embodiments, the labeling module 130 can label entire data rows or data columns, such as for large datasets that have been tabularized. More than one way can be used to assign labels. For example, a label for one data row may be "failed," and for another row may be "improved." It should be understood, however, that the labeling process also can assign a different label pair to the same dataset, such as "not so good" and "super," or even "bad," "improved," and "super." These naming conventions are merely examples, and should not be construed as being limiting in any way. One reason why different label strategies may be implemented is to enable a smooth feeding to different machine learning models such as implemented by the output system 136 or multiples thereof embodied as a machine learning system (best shown in FIG. 6).

The setup module 126 also can define one or more publishing policies. The publishing policies can be executed by the summary/notification/publication module 132 to define how, when, and if the resulting labeled dataset is ready for use. If the dataset is ready, a publishing process can read the policies and publish the dataset to the output system 136 for later use by a human or a machine learning process, for example. However, in some cases, a notification is needed. For example, if after the labeling process, all data rows include a label indicative of failure, one or more notification policies can be executed, by the summary/notification/publication module 132, to instruct the ACLGDL system 124 to notify an external mitigation processor or network operations group (such as the output system 136 or a portion thereof).

Figure 2:
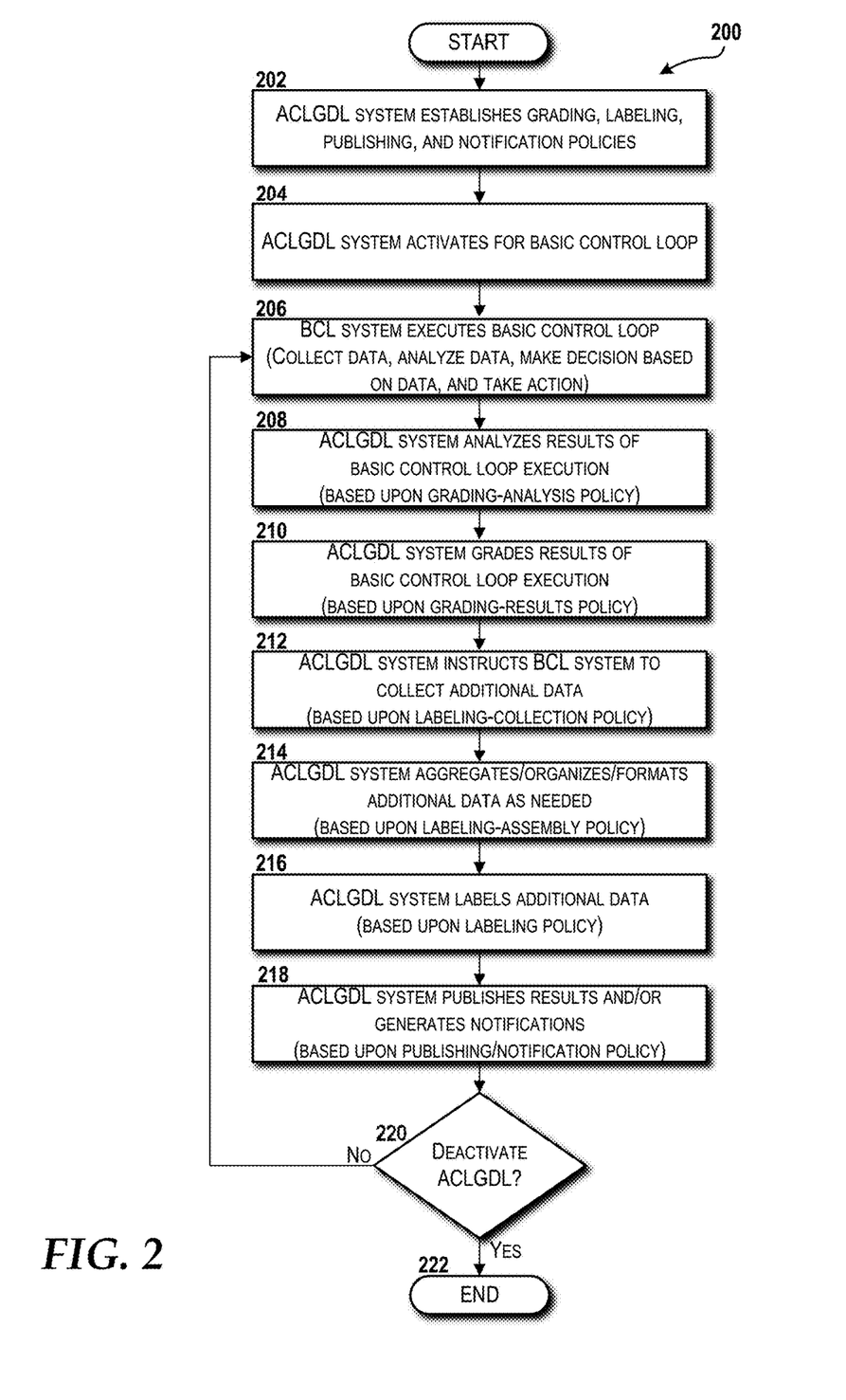
FIG. 2 is a flow diagram illustrating aspects of a method for automatic control loop grading and data labeling, according to an illustrative embodiment of the concepts and technologies disclosed herein.

Turning now to FIG. 2, a flow diagram illustrating aspects of a method 200 for automatic control loop grading and data labeling will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202. At operation 202, the ACLGDL system 124 executes the setup module 126 to establish one or more policies 116. The policies 116 can include one or more grading-analysis policies, one or more grading-results policies, one or more labeling-collection policies, one or more labeling-assembly policies, one or more labeling policies, one or more publishing policies, one or more notification policies, or any combination thereof. These policies 116 and examples of each are described above.

From operation 202, the method 200 proceeds to operation 204. At operation 204, the ACLGDL system 124 activates for a given basic control loop implemented by the BCL system 102. In other words, the ACLGDL system 124 is readied for grading and labeling output of a given basic control loop implemented by the BCL system 102. The ACLGDL system 124 may be activated for multiple basic control loops implemented by the same or different BCL system 102. For ease of explanation, however, the method 200 will focus on a single basic control loop implemented by a single BCL system 102.

From operation 204, the method 200 proceeds to operation 206. At operation 206, the BCL system 102 executes the basic control loop implemented by the BCL system 102. As explained above, a control loop can mechanize one or more manual processes to execute one or more actions with minimal (or no) human interaction. For example, as described above, the BCL system 102 can collect data from the cloud computing platform 106, analyze the collected data, make one or more decisions based upon the data in accordance with one or more policies, and take one or more actions responsive to the decision(s). This is a simplified control loop, but those skilled in the art will appreciate the applicability of the concepts and technologies disclosed herein to other control loops, including control loops having less or more functionality. As such, the simplified control loop described herein should be construed as only one non-limiting example of a control loop.

From operation 206, the method 200 proceeds to operation 208. At operation 208, the ACLGDL system 124, via execution of the correlation module 128, analyzes the results of basic control loop execution based upon one or more grading-analysis policies. From operation 208, the method 200 proceeds to operation 210. At operation 210, the ACLGDL system 124, via execution of the correlation module 128, grades the results of basic control execution based upon one or more grading-results policies.

From operation 210, the method 200 proceeds to operation 212. At operation 212, the ACLGDL system 124, via execution of the labeling module 130, instructs the BCL system 102 to collect additional data from the cloud computing platform 106 or a portion thereof based upon one or more labeling-collection policies. As noted above, the additional data may be associated with other domains such as other cloud computing platforms for comparison. Borrowing the use case example introduced above with respect to FIG. 1, the additional data may be associated with one or more compute instances tasked with the same or similar tasks.

From operation 212, the method 200 proceeds to operation 214. At operation 214, the ACLGDL system 124, via execution of the labeling module 130, aggregates, organizes, and formats the additional data as needed based upon one or more labeling-assembly policies. From operation 214, the method 200 proceeds to operation 216. At operation 216, the ACLGDL system 124, via execution of the labeling module 130, labels the additional data based upon one or more labeling policies. The labeled data can be stored in the storage module 134.

From operation 216, the method 200 proceeds to operation 218. At operation 218, the ACLGDL system 124, via execution of the summary/notification/publication module 132, publishes, to the output system 136, the results of the ACLGDL system 124 based upon one or more publication policies. The results, such as the grade for the basic control loop execution and the labelled data, can be provided to the output system 136 for later use by a human or a machine learning process, for example. However, in some cases, a notification is needed. For example, if after the labeling process, all data rows include a label indicative of failure, one or more notification policies can be executed, by the summary/notification/publication module 132, to instruct the ACLGDL system 124 to notify an external mitigation processor or network operations group (such as the output system 136 or a portion thereof).

From operation 218, the method 200 proceeds to operation 220. At operation 220, the ACLGDL system 124 determines whether or not to deactivate the grading and labeling process. If the ACLGDL system 124 determines that the grading and labeling process is completed (e.g., the basic control loop is now performing with an acceptable grade), the method 200 can proceed to operation 222. The method 200 can end at operation 222. If, however, additional rounds of the grading and labeling process are needed to improve the grade of the basic control loop execution, the method 200 can return to operation 206, where the BCL system 102 can execute the basic control loop after changes have been made.

Figure 3:
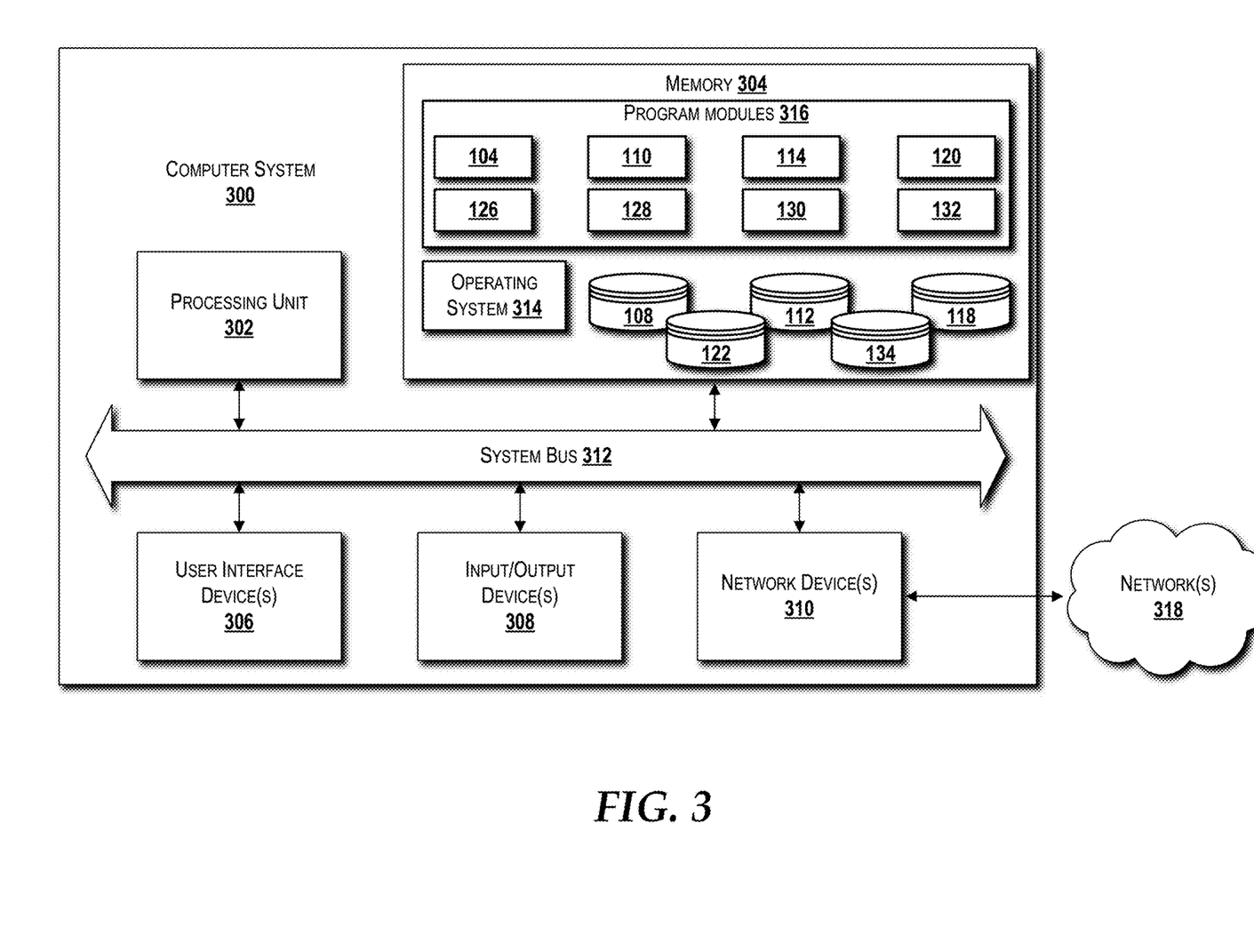
FIG. 3 is a block diagram illustrating an example computer system, according to some illustrative embodiments.

Turning now to FIG. 3, a block diagram illustrating a computer system 300 configured to provide the functionality described herein in accordance with various embodiments of the concepts and technologies disclosed herein will be described. In some embodiments, the BCL system 102, the ACLGDL system 124, the output system 136, one or more components thereof, and/or other systems disclosed herein can be configured like and/or can have an architecture similar or identical to the computer system 300 described herein with respect to FIG. 3. It should be understood, however, that any of these systems, devices, or elements may or may not include the functionality described herein with reference to FIG. 3.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer system 300.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 316 can include various software and/or program modules described herein, such as the data collection module 104, the analysis module 110, the policy/decision module 114, and the action taking module 120 for embodiments in which the BCL system 102 is implemented based, at least in part, upon the architecture of the computer system 300. For embodiments in which the ACLGDL system 124 is implemented based, at least in part, upon the architecture of the computer system 300, the program modules 316 can include the setup module 126, the correlation module 128, the labeling module 130, and the summary/notification/publication module 132. In the illustrated example, the memory 304 also can include the raw collected data database 108, the analysis state database 112, the decision state database 118, and the action state database 122 for implementations of the BCL system 102. The memory 304 also can include the storage module 134 for implementations of the ACLGDL system 124.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer to output data.

Figure 4:
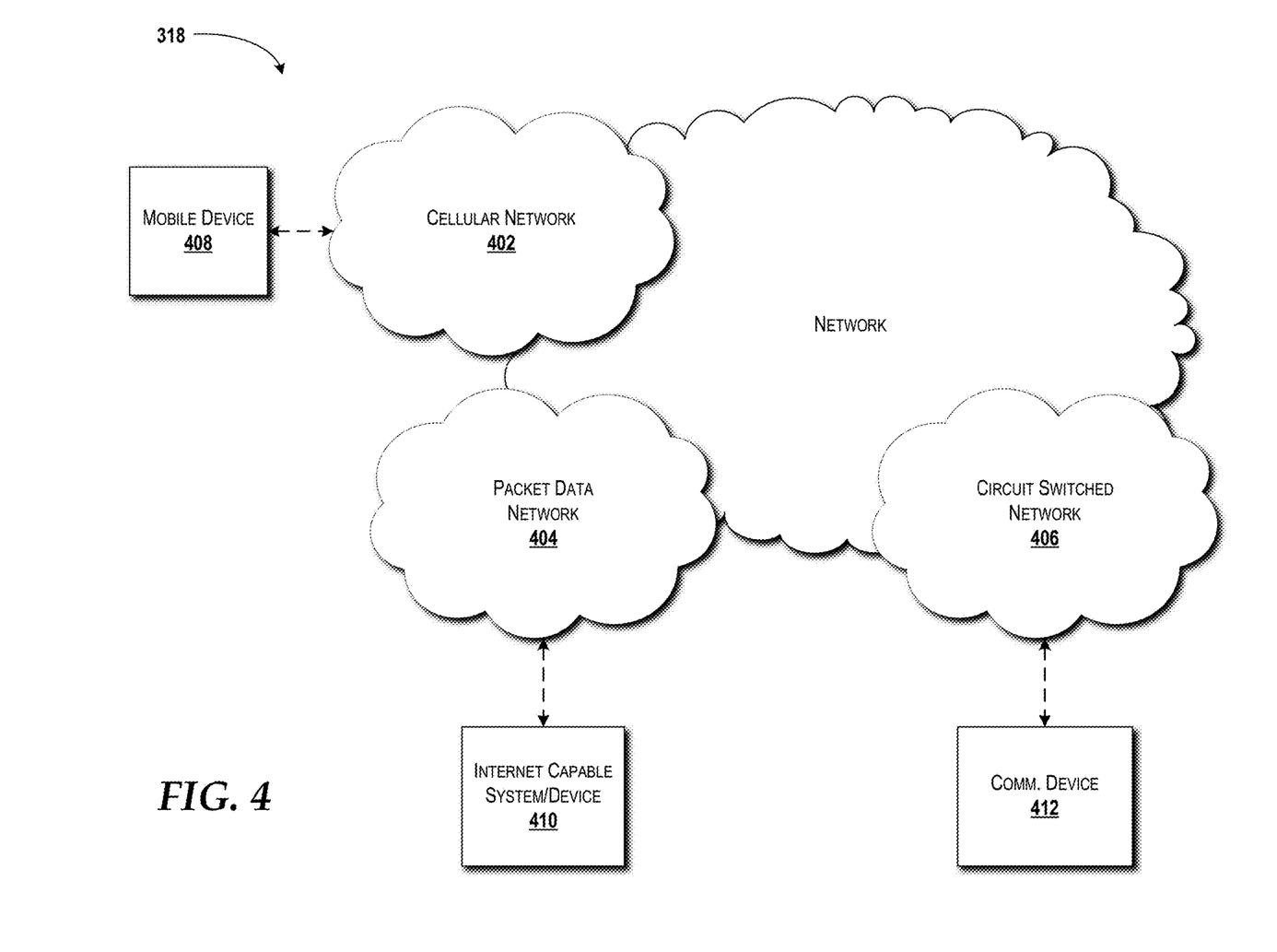
FIG. 4 schematically illustrates a network, according to an illustrative embodiment.

The network devices 310 enable the computer system 300 to communicate with other networks or remote systems via one or more networks, such as the network 318 (best shown in FIG. 4). Examples of the network devices 310 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Turning now to FIG. 4, additional details of an embodiment of the network 318 will be described, according to an illustrative embodiment. In the illustrated embodiment, the network 318 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile communications device 408 can communicate with the cellular network 402 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communication device 408 and the cellular network 402 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the cellular network 402 may additionally include backbone infrastructure that operates on wired communications technologies, including, but not limited to, optical fiber, coaxial cable, twisted pair cable, and the like to transfer data between various systems operating on or in communication with the cellular network 402.

The packet data network 404 can include various devices, for example, the BCL system 102, the ACLGDL system 124, the output system 136, servers, computers, databases, and other devices in communication with one another. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet.

The circuit switched network 406 includes various hardware and software for providing circuit switched communications. The circuit switched network 406 may include, or may be, what is often referred to as a plain old telephone system ("POTS"). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable systems/devices 410, for example, the BCL system 102, the ACLGDL system 124, the output system 136, a personal computer ("PC"), a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. It should be appreciated that substantially all of the functionality described with reference to the network 318 can be performed by the cellular network 402, the packet data network 404, and/or the circuit switched network 406, alone or in combination with additional and/or alternative networks, network elements, and the like.

Figure 5:
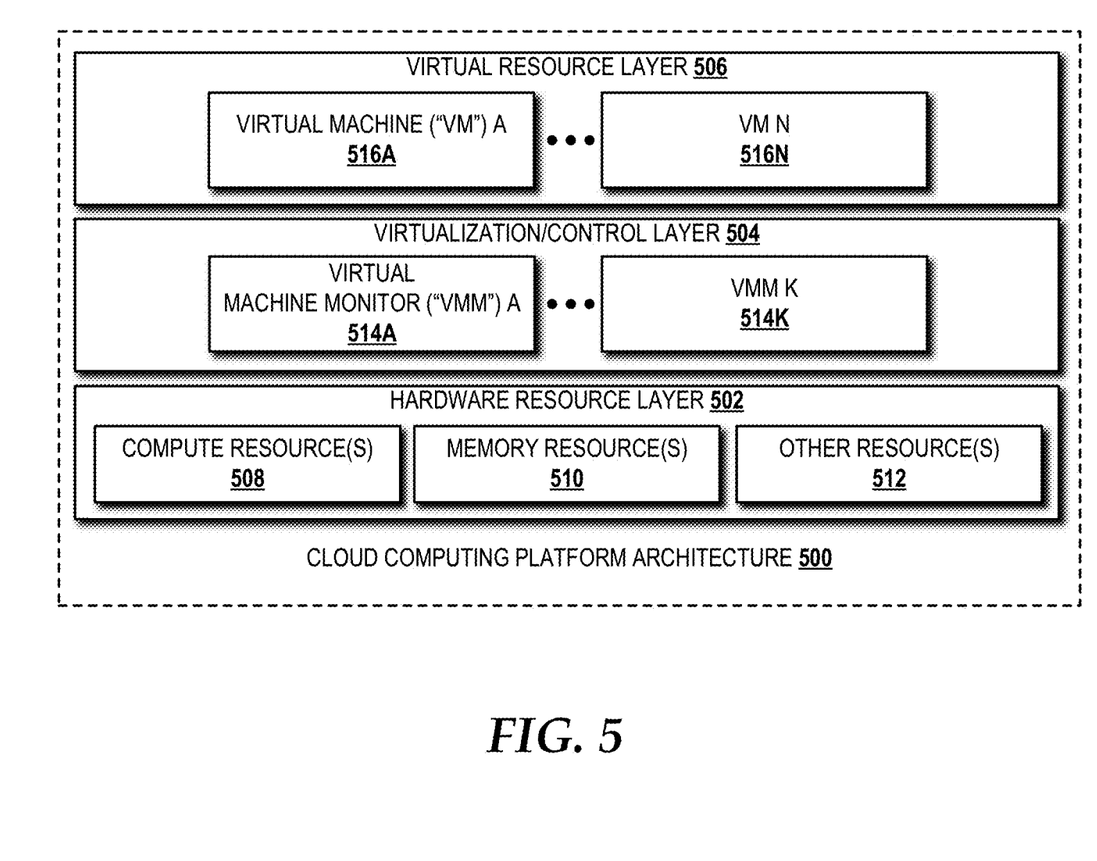
FIG. 5 is a block diagram illustrating a cloud computing platform capable of implementing aspects of the concepts and technologies disclosed herein.

Turning now to FIG. 5, a cloud computing platform architecture 500 capable of implementing aspects of the concepts and technologies disclosed herein will be described, according to an illustrative embodiment. In some embodiments, the cloud computing platform 106 can be implemented, at least in part, on the cloud computing platform architecture 500. The ACLGDL system 124 and/or the BCL system 102 also can be implemented, at least in part, on the cloud computing platform architecture 500. Those skilled in the art will appreciate that the illustrated cloud computing platform architecture 500 is a simplification of but one possible implementation of an illustrative cloud computing platform, and as such, the cloud computing platform architecture 500 should not be construed as limiting in any way.

The illustrated cloud computing platform architecture 500 includes a hardware resource layer 502, a virtualization/control layer 504, and a virtual resource layer 506 that work together to perform operations as will be described in detail herein. While connections are shown between some of the components illustrated in FIG. 5, it should be understood that some, none, or all of the components illustrated in FIG. 5 can be configured to interact with one other to carry out various functions described herein. In some embodiments, the components are arranged so as to communicate via one or more networks (not shown). Thus, it should be understood that FIG. 5 and the following description are intended to provide a general understanding of a suitable environment in which various aspects of embodiments can be implemented, and should not be construed as being limiting in any way.

The hardware resource layer 502 provides hardware resources, which, in the illustrated embodiment, include one or more compute resources 508, one or more memory resources 510, and one or more other resources 512. The compute resource(s) 506 can include one or more hardware components that perform computations to process data, and/or to execute computer-executable instructions of one or more application programs, operating systems, and/or other software. The compute resources 508 can include one or more central processing units ("CPUs") configured with one or more processing cores. The compute resources 508 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 508 can include one or more discrete GPUs. In some other embodiments, the compute resources 508 can include CPU and GPU components that are configured in accordance with a co-processing CPU/GPU computing model, wherein the sequential part of an application executes on the CPU and the computationally-intensive part is accelerated by the GPU. The compute resources 508 can include one or more system-on-chip ("SoC") components along with one or more other components, including, for example, one or more of the memory resources 510, and/or one or more of the other resources 512. In some embodiments, the compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 508 can be or can include one or more hardware components architected in accordance with an ARM architecture, available for license from ARM HOLDINGS of Cambridge, United Kingdom. Alternatively, the compute resources 508 can be or can include one or more hardware components architected in accordance with an x86 architecture, such an architecture available from INTEL CORPORATION of Mountain View, Calif., and others. Those skilled in the art will appreciate the implementation of the compute resources 508 can utilize various computation architectures, and as such, the compute resources 508 should not be construed as being limited to any particular computation architecture or combination of computation architectures, including those explicitly disclosed herein.

The memory resource(s) 510 can include one or more hardware components that perform storage operations, including temporary or permanent storage operations. In some embodiments, the memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 508.

The other resource(s) 512 can include any other hardware resources that can be utilized by the compute resources(s) 506 and/or the memory resource(s) 510 to perform operations. The other resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 502 can be virtualized by one or more virtual machine monitors ("VMMs") 514A-514K (also known as "hypervisors;" hereinafter "VMMs 514") operating within the virtualization/control layer 504 to manage one or more virtual resources that reside in the virtual resource layer 506. The VMMs 514 can be or can include software, firmware, and/or hardware that alone or in combination with other software, firmware, and/or hardware, manages one or more virtual resources operating within the virtual resource layer 506.

The virtual resources operating within the virtual resource layer 506 can include abstractions of at least a portion of the compute resources 508, the memory resources 510, the other resources 512, or any combination thereof. These abstractions are referred to herein as virtual machines ("VMs"). In the illustrated embodiment, the virtual resource layer 506 includes VMs 516A-516N (hereinafter "VMs 516").

Figure 6:
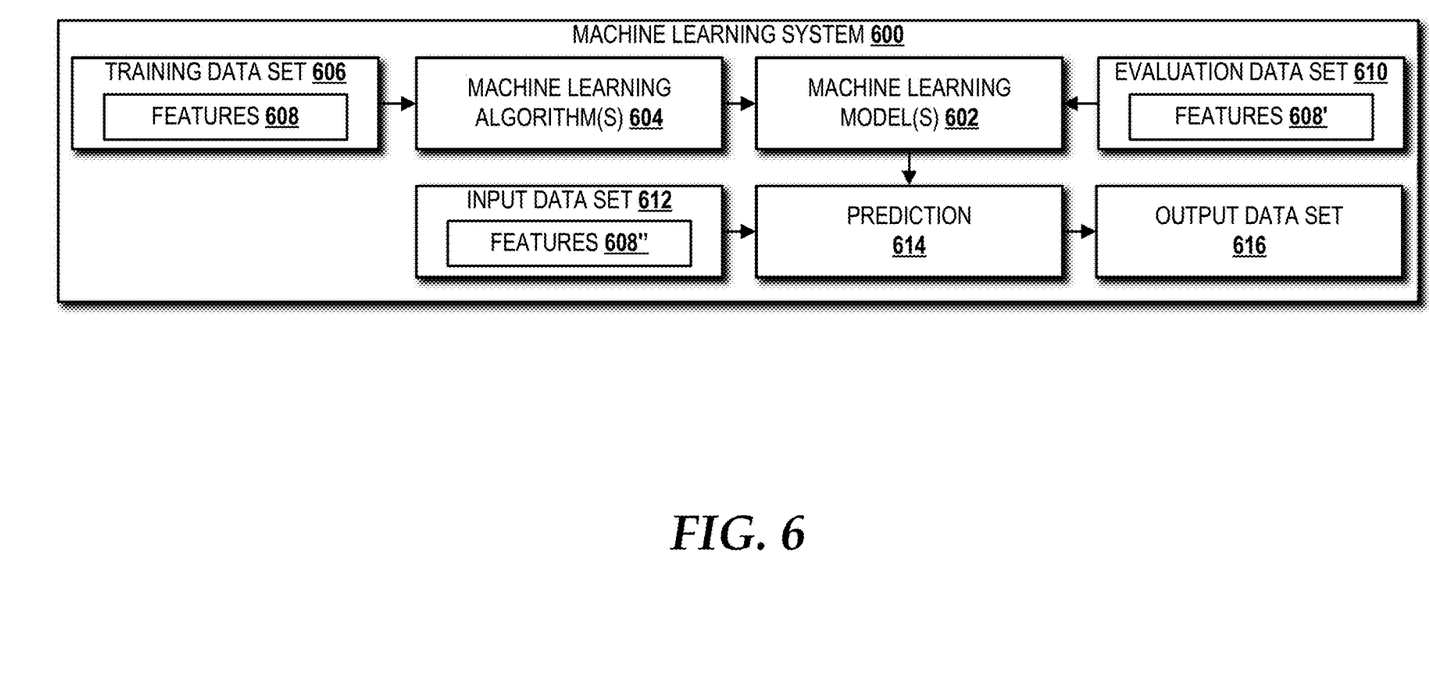
FIG. 6 is a block diagram illustrating a machine learning system capable of implementing aspects of the concept and technologies disclosed herein.

Turning now to FIG. 6, a machine learning system 600 capable of implementing aspects of the embodiments disclosed herein will be described. In some embodiments, the output system 136 can be a machine learning system such as the machine learning system 600. The illustrated machine learning system 600 includes one or more machine learning models 602. The machine learning models 602 can include supervised and/or semi-supervised learning models. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Based on the foregoing, it should be appreciated that aspects of automated control loop grading and data labeling have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
defining, by an automated control loop grading and data labeling ("ACLGDL") system executing, via a processor, a plurality of policies;
activating the ACLGDL system for a control loop to be executed by a control loop system, wherein the control loop uses data collected from a domain;
determining, by the ACLGDL system, that the control loop system has executed the control loop and has generated a result;
analyzing, by the ACLGDL system, the result of the control loop based upon a grading-analysis policy that defines how the ACLGDL system is to evaluate a performance of the control loop;
grading, by the ACLGDL system, the result of the control loop based upon a grading-results policy that defines how the ACLGDL system is to determine a grade for the performance of the control loop;
instructing, by the ACLGDL system, the control loop system to collect additional data from the domain based upon a labeling-collection policy that defines the additional data to be collected;
preparing, by the ACLGDL system, the additional data for labeling based upon a labeling assembly policy that defines how the additional data is to be aggregated, organized, and formatted for labeling;
labeling, by the ACLGDL system, the additional data for use by an output system based upon a labeling policy that defines how the additional data is to be labeled, thereby creating labeled data; and
publishing, by the ACLGDL system, to the output system, the grade for the performance of the control loop and the labeled data based upon a publishing policy that defines how the labeled data is to be published.

2. The method of claim 1, wherein the output system comprises a machine learning system or a system operated by a user.

3. The method of claim 1, wherein the labeled data comprises a label indicative of a failure; and further comprising proactively notifying, by the ACLGDL system, a mitigation entity of the label indicative of the failure based upon a notification policy that defines the mitigation entity.

4. The method of claim 1, wherein the domain comprises a cloud computing platform.

5. The method of claim 1, further comprising determining whether or not to deactivate the ACLGDL.

6. The method of claim 5, wherein determining to deactivate the ACLGDL is based upon the grade for the performance of the control loop achieving an acceptable grade.

7. The method of claim 5, wherein determining not to deactivate the ACLGDL is based upon the grade for the performance of the control loop not achieving an acceptable grade.

8. The method of claim 7, further comprising activating the ACLGDL system for at least one additional control loop to be executed by the control loop system.

9. A computer-readable storage medium comprising computer-executable instructions that, when executed by a processor, cause the processor to perform operations comprising:
defining a plurality of policies;
activating an automated control loop grading and data labeling ("ACLGDL") system for a control loop to be executed by a control loop system, wherein the control loop uses data collected from a domain;
determining that the control loop system has executed the control loop and has generated a result;
analyzing the result of the control loop based upon a grading-analysis policy that defines how the ACLGDL system is to evaluate a performance of the control loop;
grading the result of the control loop based upon a grading-results policy that defines how the ACLGDL system is to determine a grade for the performance of the control loop;
instructing the control loop system to collect additional data from the domain based upon a labeling-collection policy that defines the additional data to be collected;
preparing the additional data for labeling based upon a labeling assembly policy that defines how the additional data is to be aggregated, organized, and formatted for labeling;
labeling the additional data for use by an output system based upon a labeling policy that defines how the additional data is to be labeled, thereby creating labeled data; and
publishing, to the output system, the grade for the performance of the control loop and the labeled data based upon a publishing policy that defines how the labeled data is to be published.

10. The computer-readable storage medium of claim 9, wherein the output system comprises a machine learning system or a system operated by a user.

11. The computer-readable storage medium of claim 9, wherein the labeled data comprises a label indicative of a failure; and further comprising proactively notifying a mitigation entity of the label indicative of the failure based upon a notification policy that defines the mitigation entity.

12. The computer-readable storage medium of claim 9, wherein the domain comprises a cloud computing platform.

13. The computer-readable storage medium of claim 9, wherein the operations further comprise determining whether or not to deactivate the ACLGDL.

14. The computer-readable storage medium of claim 13, wherein determining to deactivate the ACLGDL is based upon the grade for the performance of the control loop achieving an acceptable grade.

15. The computer-readable storage medium of claim 13, wherein determining not to deactivate the ACLGDL is based upon the grade for the performance of the control loop not achieving an acceptable grade.

16. The computer-readable storage medium of claim 15, wherein the operations further comprise activating the ACLGDL system for at least one additional control loop to be executed by the control loop system.

17. An automated control loop grading and data labeling ("ACLGDL") system comprising:
a processor; and
a memory comprising computer-executable instructions that, when executed by the processor, cause the processor to perform operations comprising
defining a plurality of policies,
activating the ACLGDL system for a control loop to be executed by a control loop system, wherein the control loop uses data collected from a domain,
determining that the control loop system has executed the control loop and has generated a result,
analyzing the result of the control loop based upon a grading-analysis policy that defines how the ACLGDL system is to evaluate a performance of the control loop,
grading the result of the control loop based upon a grading-results policy that defines how the ACLGDL system is to determine a grade for the performance of the control loop,
instructing the control loop system to collect additional data from the domain based upon a labeling-collection policy that defines the additional data to be collected,
preparing the additional data for labeling based upon a labeling assembly policy that defines how the additional data is to be aggregated, organized, and formatted for labeling,
labeling the additional data for use by an output system based upon a labeling policy that defines how the additional data is to be labeled, thereby creating labeled data, and
publishing, to the output system, the grade for the performance of the control loop and the labeled data based upon a publishing policy that defines how the labeled data is to be published.

18. The ACLGDL system of claim 17, wherein the operations further comprise determining whether or not to deactivate the ACLGDL.

19. The ACLGDL system of claim 18, wherein determining to deactivate the ACLGDL is based upon the grade for the performance of the control loop achieving an acceptable grade.

20. The ACLGDL system of claim 18, wherein determining not to deactivate the ACLGDL is based upon the grade for the performance of the control loop not achieving an acceptable grade.

* * * * *